United States Patent
Kamrat

(10) Patent No.: US 9,028,140 B2
(45) Date of Patent: May 12, 2015

(54) TEMPERATURE SENSOR HAVING A FRAME MADE OF A MINERAL MATERIAL

(75) Inventor: Esko Kamrat, Vantaa (FI)

(73) Assignee: Janesko Oy, Vantaa (FI)

( * ) Notice: Subject to any disclaimer, the term of this patent is extended or adjusted under 35 U.S.C. 154(b) by 97 days.

(21) Appl. No.: 13/274,000

(22) Filed: Oct. 14, 2011

(65) Prior Publication Data

US 2012/0128029 A1 May 24, 2012

(30) Foreign Application Priority Data

Oct. 14, 2010 (FI) .................................... 20106066

(51) Int. Cl.
| | |
|---|---|
| *G01K 7/00* | (2006.01) |
| *G01K 13/02* | (2006.01) |
| *G01K 1/14* | (2006.01) |
| *G01K 1/16* | (2006.01) |

(52) U.S. Cl.
CPC ........ *G01K 13/02* (2013.01); *G01K 1/14* (2013.01); *G01K 1/16* (2013.01); *G01K 2013/026* (2013.01)

(58) Field of Classification Search
USPC ......... 374/163, 178, 183, 185, 208, 141, 120, 374/121, 130, 136
See application file for complete search history.

(56) References Cited

U.S. PATENT DOCUMENTS

| | | | |
|---|---|---|---|
| 3,845,661 A * | 11/1974 | Hollweck et al. ............. 374/208 |
| 4,129,848 A | 12/1978 | Frank et al. | |
| 4,215,577 A | 8/1980 | Griffing et al. | |
| 4,243,968 A | 1/1981 | Scott | |
| 4,516,106 A | 5/1985 | Nolting et al. | |
| 4,791,398 A | 12/1988 | Sittler et al. | |
| 5,141,334 A | 8/1992 | Castles | |
| 6,127,915 A * | 10/2000 | Gam et al. ...................... 338/28 |
| 6,354,736 B1 * | 3/2002 | Cole et al. ...................... 374/185 |
| 7,201,513 B2 * | 4/2007 | Nakabayashi ................. 374/208 |
| 2002/0172259 A1 * | 11/2002 | Bach ............................ 374/208 |
| 2004/0037347 A1 * | 2/2004 | Brown et al. ................. 374/130 |
| 2005/0213949 A1 * | 9/2005 | Koren et al. .................. 392/416 |
| 2008/0025372 A1 | 1/2008 | Culbertson et al. | |
| 2009/0066353 A1 * | 3/2009 | Devey et al. .................. 324/757 |
| 2009/0110024 A1 | 4/2009 | Kamei et al. | |
| 2010/0202490 A1 * | 8/2010 | Ishikawa et al. ............. 374/165 |

FOREIGN PATENT DOCUMENTS

| | | |
|---|---|---|
| DE | 199 05 384 A1 | 8/2000 |
| EP | 0 036 957 A2 | 10/1981 |
| GB | 1440393 A | 6/1976 |
| WO | WO 86/01027 A1 | 2/1986 |

OTHER PUBLICATIONS

Search Report issued on Jun. 1, 2011, by Finnish Patent Office for Application No. 20106066.

(Continued)

*Primary Examiner* — Lisa Caputo
*Assistant Examiner* — Janice M Soto
(74) *Attorney, Agent, or Firm* — Buchanan Ingersoll & Rooney PC

(57) ABSTRACT

The invention relates to a measuring sensor for measuring temperature in a chemical process, the measuring sensor comprising a measuring element supported on the frame of the measuring sensor and arranged in thermal contact with the process being measured, and measuring conductors connected to the measuring element for directing a measuring signal onward. The frame of the measuring sensor is made of mineral material.

22 Claims, 3 Drawing Sheets

(56) References Cited

OTHER PUBLICATIONS

Search Report dated May 27, 2011, issued in corresponding Finnish Application No. 20106065.

Office Action issued by the U.S. Patent and Trademark Office in the U.S. Appl. No. 13/273,907, mailed Aug. 19, 2013, U.S. Patent and Trademark Office, Alexandria, VA. (15 pages).

Office Action dated Sep. 25, 2014 issued by the U.S. Patent and Trademark Office in corresponding U.S. Appl. No. 13/273,907.

* cited by examiner

TEMPERATURE SENSOR HAVING A FRAME MADE OF A MINERAL MATERIAL

RELATED APPLICATIONS

This application claims priority under 35 U.S.C. §119 to Finish Patent Application No. 20106066 filed in Finland on Oct. 14, 2010, the entire content of which is hereby incorporated by reference in its entirety.

FIELD

The invention relates to a measuring sensor for measuring temperature in a chemical process, the measuring sensor comprising a measuring element supported on the frame of the measuring sensor and arranged in thermal contact with the process being measured, and measuring conductors connected to the measuring element for directing a measuring signal onward.

BACKGROUND INFORMATION

In chemical industry, process materials are often strong acids or alkali that tend to cause corrosion or dissolution of metals. It is possible to prevent corrosion caused by strong acids or alkali by using special metals, such as titanium, tantalum, zirconium, platinum, gold, rhodium, or alloys designed for different applications, in the manufacture of the frames of measuring sensors. Examples of such alloys are Hastelloy C and B, Monel, and Palladium titanium. However, strong chemicals dissolve even these materials, though slowly. The result is that ions of these metals end up in the solutions.

Especially in semiconductor industry, extraneous metal ions are not allowed, because they may ruin the semiconductor batch being manufactured.

Temperature measurement in the process is today made by a sensor with a frame made of metal material. The frame made of metal material is often formed of a pipe closed at the ends and a measuring element placed inside it. The measurement signal received from the measuring element is electric.

In semiconductor industry, parts installed into the process must be protected so that no metal is dissolved into the process. In these cases, the temperature sensors are coated with a suitable coating material, such as Teflon, Kynar, or some other similar coating. This type of coating protects against corrosion. However, acids penetrate even through Teflon, in which case the material of the frame begins to corrode in time.

The above-mentioned coating materials also have the disadvantage that they slow down heat transmission from the process to the sensor, since they are invariably also good heat insulators. The thickness of the coating materials cannot, however, be reduced much, because the coating then becomes vulnerable to mechanical damage and the metal surface of the sensor frame comes easily into contact with the process solution.

A coated sensor reacts slowly to temperature changes and, even at constant temperature, the reading remains as much as several degrees below the actual process temperature. This applies to high temperatures in particular.

SUMMARY

The purpose of the invention is to provide a sensor which measures temperature from a chemical process and by which the prior-art disadvantages can be eliminated. This is achieved by a measuring sensor of the invention. The measuring sensor of the invention is characterized in that the frame of the sensor is made of mineral material.

The invention provides the advantage is that the coatings causing problems can be abandoned, because the frame also endures very aggressive conditions. The chemicals used in the processes cannot detach atoms from the crystal grating of sapphire, for example, so it does not dissolve in strong chemicals, such as hydrochloric acid, sulfuric acid, nitric acid, fluorhydric acid, potassium hydroxide, and sodium hydroxide. The thermal conductivity of mineral material, for instance sapphire material, is good so a correctly constructed sensor is quick in monitoring temperature changes, and even in constant temperature, the difference between the process temperature and measured temperature remains minimal. The mechanical strength of a structure made of sapphire is also good. Modern machining methods have made it possible to manufacture sensor structures from mineral materials, such as sapphire.

BRIEF DESCRIPTION OF THE DRAWINGS

The invention will be explained in the following in more detail by means of working examples described in the attached drawing, in which.

DETAILED DESCRIPTION

Figure 1:
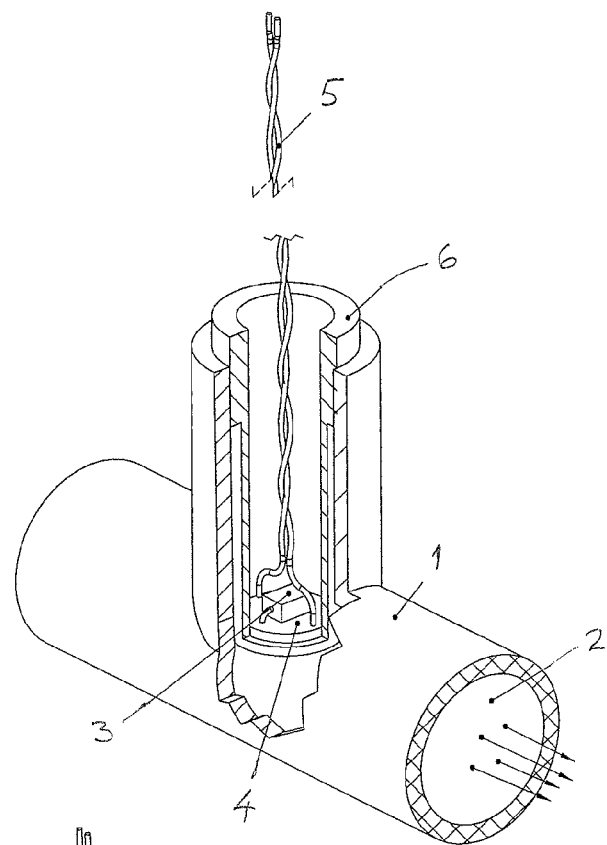
FIG. 1 is a general view of a first embodiment of the invention.

FIG. 1 is a general view of a first embodiment of a measuring sensor of the invention. Reference number 1 denotes a process pipe. Reference number 2 denotes the process liquid to be measured flowing in the process pipe. The flow of the process liquid is marked by arrows in FIG. 1.

Reference number 3 denotes a measuring element in FIG. 1. The measuring element is fastened to a heat-conductive circuit board 4. Measuring conductors are marked by reference number 5 in FIG. 1.

The measuring element 3 is in thermal contact with the process liquid 2 being measured, whereby the temperature of the process liquid can be measured by the measuring element. The measuring signal received from the measuring element 3 is transmitted on by means of the measuring conductors 5.

The measuring element 3 may be any element known per se, such as a Pt1000 resistor element. The measuring element may be fastened to its base by soldering, for instance.

The measuring conductors 5 can be connected to the measuring element 3 by means of specific connected terminal areas arranged close to the measuring element. The above-mentioned terminal areas are arranged in unrestricted thermal contact with the process liquid being measured. There is no temperature difference between the measuring element and terminal areas, which means that a temperature gradient disadvantageous to the measurement cannot be created and measuring accuracy and reaction time also improve. The above-mentioned terminal areas are clearly shown in the figures to be explained later. In the embodiment of FIG. 1, the above-mentioned terminal areas may be beside the measuring element 3 on the surface of the circuit board 4 at locations where the measuring conductors shown in FIG. 1 end.

The measuring element may be fastened to the above-mentioned terminal areas by using lines, surface mounting, or bonding, for example. The terminal areas may be formed by electrically conductive metallization, in other words, by forming with metallization an area on a heat-conductive surface.

According to the essential idea of the invention, the frame 6 of the measuring sensor is made of mineral material. The use of a monocrystalline material has been found particularly advantageous. An example of a good mineral material is sapphire that is especially well suited for the needs of semiconductor industry, for instance. In the embodiment of FIG. 1, the frame 6 is a pipe-like part, on the inner surface of which the circuit board 4 and with it the measuring element 3 are placed.

The advantageousness of sapphire is due to the fact that the used chemicals cannot detach atoms from the crystal grating of sapphire, in which case no harmful dissolution takes place. Other advantages of sapphire are its good heat-conduction and mechanical strength.

Figure 2:
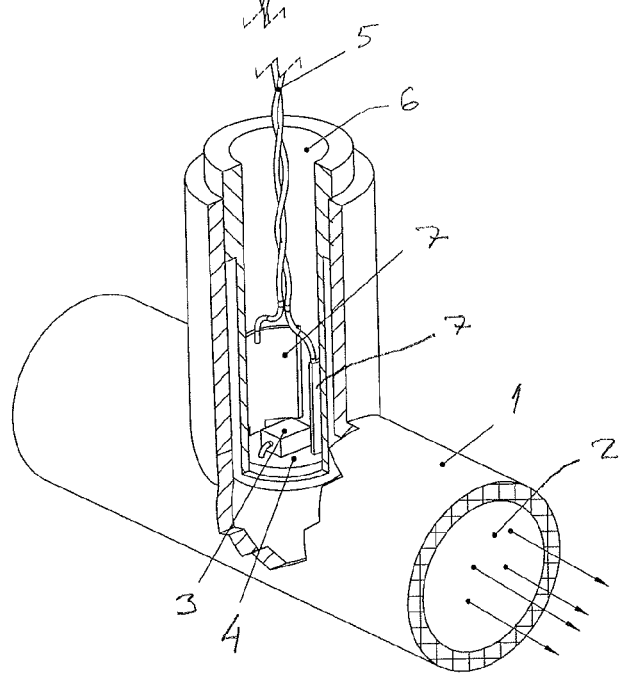
FIG. 2 is a general view of a second embodiment of the invention.

FIG. 2 shows another embodiment of the invention. The same reference numbers are used in FIG. 2 as in FIG. 1 to refer to the corresponding parts. The above-mentioned terminal areas placed close to the measuring element 3 are marked in FIG. 2 by reference number 7. In the embodiment of FIG. 2, the terminal areas 7 are located on the surface of the frame 6 made of mineral material.

Figure 3:
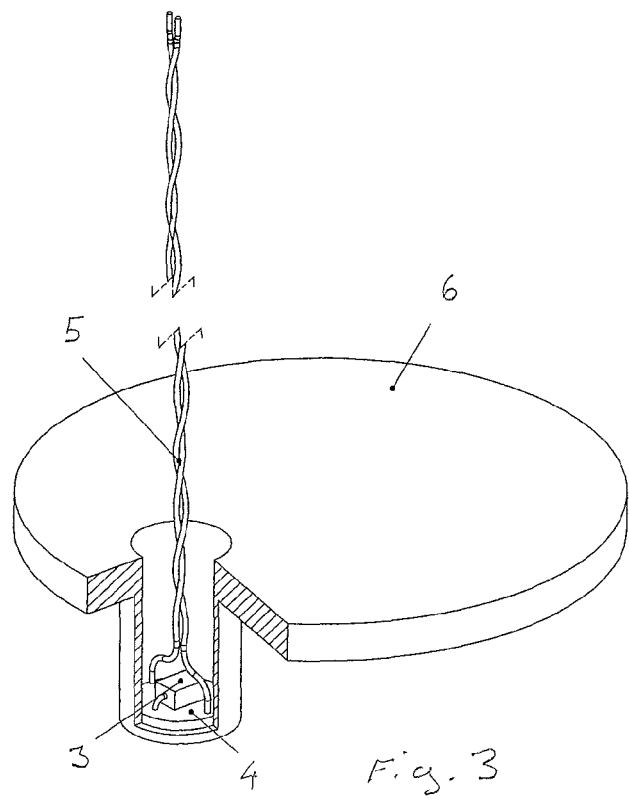
FIG. 3 is a general view of a third embodiment of the invention.

FIG. 3 shows a third embodiment of the measuring sensor according to the invention. The same reference numbers are used in FIG. 3 as in FIGS. 1 and 2 to refer to the corresponding parts.

In the embodiment of FIG. 3, the frame 6 made of mineral material forms an optical window, and the heat-conductive circuit board 4 and measuring element 3 are located in the pipe-like part thereof. The embodiment of FIG. 3 may be located in an opening formed in the process pipe.

Figure 4:
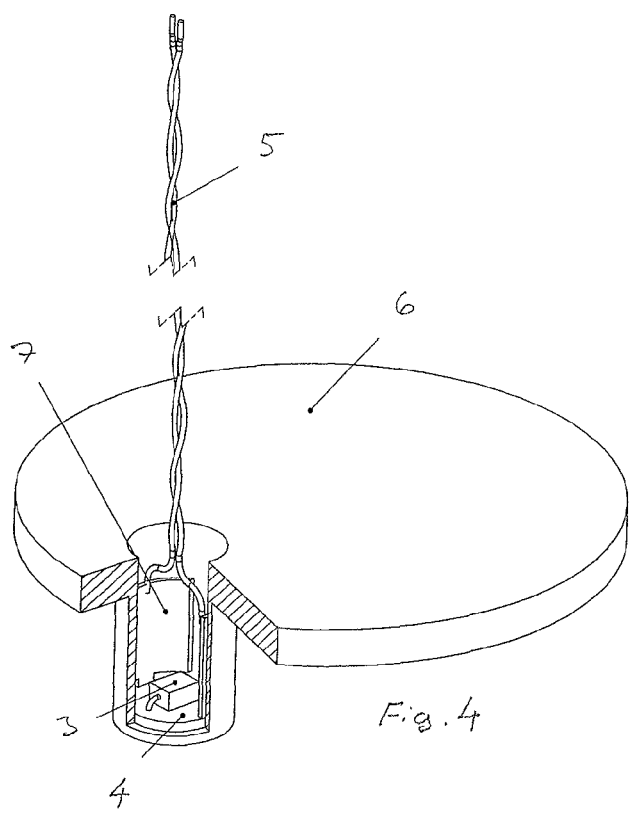
FIG. 4 is a general view of a fourth embodiment of the invention.

FIG. 4 shows a fourth embodiment of the measuring sensor according to the invention. The same reference numerals are used in FIG. 4 as in FIGS. 1 to 3 to refer to the corresponding parts.

The embodiment of FIG. 4 corresponds to that of FIG. 3. The difference is that in the embodiment of FIG. 4, the terminal areas 7 are located on the inner surface of the pipe-like part of the frame made of mineral material. In the embodiment of FIG. 3, the terminal areas may also be on the surface of the circuit board as shown in FIG. 1.

Figure 5:
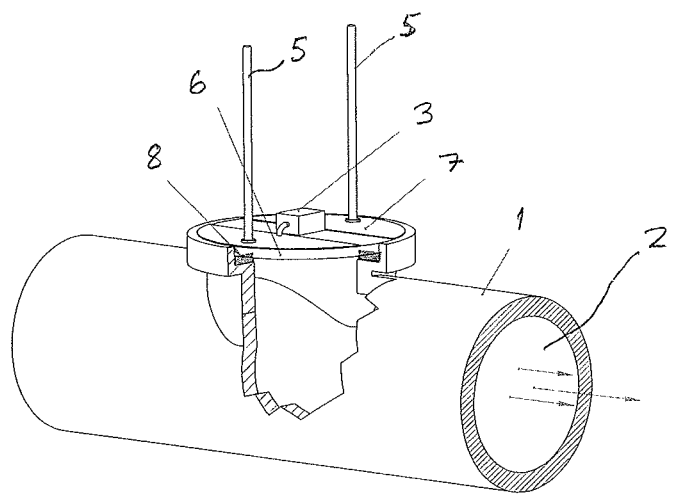
FIG. 5 is a general view of a fifth embodiment of the invention.

FIG. 5 shows a fifth embodiment of the invention. The same reference numerals are used in FIG. 5 as in FIGS. 1 to 4 to refer to the corresponding parts.

The embodiment of FIG. 5 corresponds in principle to that of FIGS. 3 and 4. However, in the embodiment of FIG. 5, the frame 6 made of mineral material is formed into an essentially planar element that is attached by means of a packing 8 to an opening formed in the process pipe.

The above embodiment of the invention are not intended to limit the invention in any way, but the invention and its details may naturally be varied entirely freely within the scope of the claims. The shape or dimensions of the frame made of mineral material are naturally not restricted to the examples of the figures, but the shape and dimensions may be freely varied according to need.

The invention claimed is:

1. A measuring sensor for measuring temperature in a chemical process, the measuring sensor comprising:

a measuring element supported on an inner surface of a frame, the frame being configured to be in contact with a process liquid to be measured and the measuring element being configured to be in thermal contact with the process liquid being measured; and measuring conductors connected to the measuring element for directing a measuring signal forward, wherein the frame of the measuring sensor is made of mineral material and arranged to form an optical window which is configured to be in contact with the process liquid to be measured.

2. A measuring sensor as claimed in claim 1, wherein the mineral material is a monocrystalline mineral material.

3. A measuring sensor as claimed in claim 2, wherein the mineral material is sapphire.

4. A measuring sensor as claimed in claim 1, wherein the mineral material is sapphire.

5. A measuring sensor as claimed in claim 1, comprising:

a heat-conductive circuit board configured to be fastened to the measuring element.

6. A measuring sensor as claimed in claim 5, wherein the frame includes a cylindrical portion, and the measuring element and the heat-conductive circuit board are located within the cylindrical portion of the frame.

7. A measuring sensor as claimed in claim 6, wherein the measuring conductors are connected to the measuring element by terminal areas arranged close to and not in physical contact with the measuring element, and wherein the terminal areas are arranged in unrestricted thermal contact with the process liquid being measured and located within the cylindrical portion of the frame.

8. A measuring sensor as claimed in claim 1, wherein the measuring element is a Pt 1000 resistor element.

9. A measuring sensor as claimed in claim 1, in combination with a process pipe.

10. A measuring sensor as claimed in claim 1, wherein the measuring element is supported on a portion of the frame, which is essentially planar.

11. A measuring sensor as claimed in claim 1, wherein the frame is formed into an essentially planar element that is attached by means of a packing to an opening in the process pipe.

12. A measuring sensor as claimed in claim 1, wherein the measuring conductors are connected to the measuring element by terminal areas arranged close to and not in physical contact with the measuring element, and wherein the terminal areas are arranged in unrestricted thermal contact with the process liquid being measured.

13. A measuring sensor as claimed in claim 12, wherein the terminal areas are formed by electrically conductive metallization.

14. A measuring sensor for measuring temperature in a chemical process, the measuring sensor comprising:

a measuring element supported on an inner surface of a frame, the frame being configured to be in contact with a process liquid to be measured and the measuring element being configured to be in thermal contact with the process liquid being measured; and measuring conductors connected to the measuring element for directing a measuring signal forward, wherein the frame of the measuring sensor is made of mineral material.

15. A measuring sensor as claimed in claim 14, wherein the mineral material is a monocrystalline mineral material.

16. A measuring sensor as claimed in claim 14, wherein the mineral material is sapphire.

17. A measuring sensor as claimed in claim 14, comprising:
- a heat-conductive circuit board configured to be fastened to the measuring element; and
- wherein the frame includes a cylindrical portion, and the measuring element and the heat-conductive circuit board are located within the cylindrical portion of the frame.

18. A measuring sensor as claimed in claim 14, wherein the measuring element is a Pt 1000 resistor element.

19. A measuring sensor as claimed in claim 14, in combination with a process pipe.

20. A measuring sensor as claimed in claim 14, wherein the measuring element is supported on a portion of the frame, which is essentially planar.

21. A measuring sensor as claimed in claim 14, wherein the frame is formed into an essentially planar element that is attached by means of a packing to an opening in the process pipe.

22. A measuring sensor as claimed in claim 14, wherein the measuring conductors are connected to the measuring element by terminal areas arranged close to and not in physical contact with the measuring element, and wherein the terminal areas are arranged in unrestricted thermal contact with the process liquid being measured.

\* \* \* \* \*